(12) United States Patent
Wurthner et al.

(10) Patent No.: US 8,939,870 B2
(45) Date of Patent: Jan. 27, 2015

(54) METHOD FOR CONTROLLING A ROLLING OR COASTING FUNCTION OF A VEHICLE

(75) Inventors: Maik Wurthner, Markdorf (DE); Ingo Sauter, Meckenbeuren (DE); Joachim Staudinger, Ravensburg (DE); Johannes Kemler, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 457 days.

(21) Appl. No.: 13/505,539

(22) PCT Filed: Oct. 13, 2010

(86) PCT No.: PCT/EP2010/065297
§ 371 (c)(1),
(2), (4) Date: May 2, 2012

(87) PCT Pub. No.: WO2011/054635
PCT Pub. Date: May 12, 2011

(65) Prior Publication Data
US 2012/0220422 A1    Aug. 30, 2012

(30) Foreign Application Priority Data
Nov. 3, 2009   (DE) .......................... 10 2009 046 341

(51) Int. Cl.
*B60W 10/04*    (2006.01)
*B60W 10/02*    (2006.01)
*B60W 10/06*    (2006.01)
(Continued)

(52) U.S. Cl.
CPC .............. *B60W 10/02* (2013.01); *B60W 10/06* (2013.01); *B60W 10/11* (2013.01); *B60W 10/184* (2013.01); *B60W 30/18072* (2013.01); *B60W 2520/105* (2013.01); *B60W 2550/142* (2013.01); *F16H 59/66* (2013.01); *F16H 2059/186* (2013.01)
USPC .......................................... 477/186; 477/187

(58) Field of Classification Search
USPC .................................................. 477/186–187
See application file for complete search history.

(56) References Cited

U.S. PATENT DOCUMENTS

| | | |
|---|---|---|
| 6,687,607 B2 | 2/2004 | Graf et al. |
| 6,929,638 B2 | 8/2005 | Gimmler et al. |
| 6,939,265 B2 | 9/2005 | Rustige et al. |
| 6,951,525 B2 | 10/2005 | Ries-Mueller |
| 7,509,202 B2 | 3/2009 | Scelers |
| 7,987,034 B2 | 7/2011 | Taffin |

(Continued)

FOREIGN PATENT DOCUMENTS

| | | |
|---|---|---|
| DE | 197 00 325 A1 | 7/1997 |
| DE | 199 20 065 A1 | 12/2000 |

(Continued)

*Primary Examiner* — Derek D Knight
(74) *Attorney, Agent, or Firm* — Davis & Bujold, PLLC; Michael J. Bujold

(57) ABSTRACT

A method of controlling a rolling or coasting function of a vehicle with a drive train having a drive motor, an automatic or automated transmission, a controllable shifting means, a brake device and a drive speed control device. The vehicle speed is regulated by the drive speed control device and the braking device is activated, as needed, when driving on a downhill gradient section. To effectively and reliably use the rolling or coasting function in suitable driving situations, taking into account the influence of the driving speed control device, a rolling or a coasting condition for a downhill gradient taper is checked, when driving on the downhill gradient section, and, when the rolling or coasting condition is satisfied, the transmission controls interrupt the flow of power in the drive train before the vehicle entering a flat area, and/or before the driving speed control device generates an engine torque request.

13 Claims, 1 Drawing Sheet

(51) Int. Cl.
  *B60W 10/11*    (2012.01)
  *B60W 10/184*   (2012.01)
  *B60W 30/18*    (2012.01)
  *F16H 59/66*        (2006.01)
  *F16H 59/18*        (2006.01)

(56) References Cited

U.S. PATENT DOCUMENTS

2004/0138027 A1\*  7/2004  Rustige et al. ............... 477/175
2010/0324793 A1    12/2010 Winkel

FOREIGN PATENT DOCUMENTS

| DE | 102 21 701 A1 | 11/2002 |
|---|---|---|
| DE | 101 51 933 A1 | 9/2003 |
| DE | 10 2004 017 115 A1 | 10/2005 |
| DE | 10 2007 001 936 A1 | 10/2007 |
| DE | 10 2007 036 794 A1 | 2/2009 |
| DE | 10 2008 023 135 A1 | 11/2009 |
| EP | 1 270 303 A2 | 1/2003 |
| EP | 1 923 291 A2 | 5/2005 |
| FR | 2 847 639 A1 | 5/2004 |
| FR | 2 851 629 A1 | 8/2004 |
| GB | 2 452 579 A | 3/2009 |
| WO | 02/099301 A1 | 12/2002 |
| WO | 03/037672 A1 | 5/2003 |
| WO | 2005/084995 A1 | 9/2005 |
| WO | 2006/107267 A1 | 10/2006 |
| WO | 2008/130288 A1 | 10/2008 |
| WO | 2009/037167 A1 | 3/2009 |

\* cited by examiner

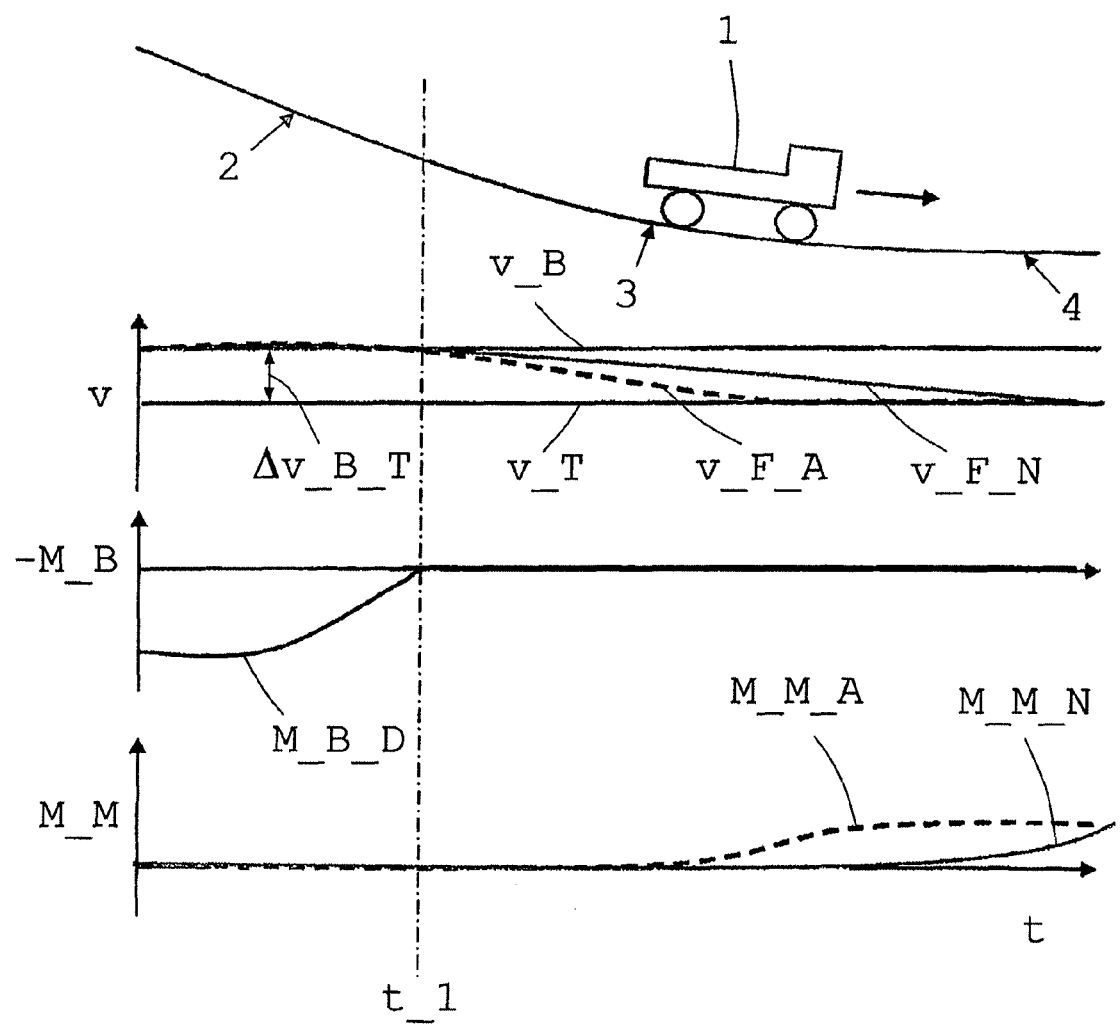

METHOD FOR CONTROLLING A ROLLING OR COASTING FUNCTION OF A VEHICLE

This application is a National Stage completion of PCT/EP2010/065297 filed Oct. 13, 2010, which claims priority from German patent application serial no. 10 2009 046 341.0 filed Nov. 3, 2009.

FIELD OF THE INVENTION

The invention relates to a method for controlling a rolling or coasting function of a vehicle.

BACKGROUND OF THE INVENTION

Saving energy and cost in the powertrain and reducing pollution from exhaust gas and noise emissions are current goals in vehicle development. In suitable driving situations, vehicles can be temporarily advanced without being driven in a rolling or coasting mode. When a motor vehicle is in rolling mode, the internal combustion engine can operate with minimized consumption and low emissions while idling as the vehicle rolls with a disengaged drive train. If the internal combustion engine is turned off in such a driving situation to further increase the savings effect, the vehicle moves in a so-called coasting mode. These functions are already known.

Depending on the available drive train components and transmission design, the flow of power can be interrupted by shifting the transmission into neutral and/or by disengaging the start-off clutch once rolling or coasting is possible according to the above definition of terms. However, it has been shown that the known methods for identifying suitable driving situations for rolling or coasting mode do not always correctly interpret the driving situation, or are relatively complex and error-prone due to a somewhat unfiltered consideration of topographical conditions of the roadway, and/or an insufficient consideration of the current driving status. This frequently results in unnecessary shifting into neutral or interruption of the flow of power in the drive train that are undesirable depending on the situation and possibly counterproductive.

Furthermore, it is known that modern vehicles are increasingly being equipped with automatic vehicle speed control functions or vehicle speed functions and separation distance control functions for reasons of comfort, traffic, and vehicle safety. Such systems are, for example, known as Tempomat or Bremsomat systems, which maintain a desired speed as specified by the driver. Known electronic devices are available as expansions of these systems for passenger cars and commercial vehicles as ACC (adaptive cruise control) or ADR (automatic distance regulation), which create a monitoring area in front of or around the vehicle with the assistance of sensors such as radar, infrared, video or ultrasound, and with their knowledge at least the separation distance from the preceding vehicle is adapted by means of a Bremsomat by automatically letting up on gas or braking.

Known Tempomat and/or Bremsomat systems in commercial vehicles react by braking with an available auxiliary brake system, when deceleration is required on a downhill gradient and/or to adapt the separation distance from the preceding vehicle, such as an input-side or output-side hydrodynamic or electrodynamic retarder and/or the service break, where the retarder is preferably used.

A method is known from DE 102 21 701 A1 to control a rolling or coasting function for a motor vehicle with an automatic transmission. With the known method, a quantity representing the vehicle speed, brake actuation and/or actuation of a fuel supply measuring element and an operating state of the internal combustion engine are detected. A clutch device is disengaged, thereby interrupting the flow of force in the drive train when neither the gas pedal, nor the fuel supply measuring element, nor the brake pedal are actuated while the internal combustion engine is running and a specific vehicle speed is exceeded. After the clutch is disengaged, the transmission is shifted into neutral and the vehicle is therefore in a rolling mode. When the gas pedal or the brake pedal is actuated, or variables having like effect are changed, the clutch is re-engaged, thereby terminating the rolling mode. Before the clutch is engaged, the rotational speeds of the internal combustion engine and a transmission input shaft are first synchronized to return from rolling mode to regular drive as smoothly as possible. The disengagement of the clutch, i.e., rolling mode are prevented when a probable need for braking is assumed. This can for example be the case while traveling downhill, when the gas pedal is suddenly released, or when a sporty driving program is selected.

A disadvantage is that although unnecessary neutral shifting is sometimes prevented close to the situation, there is no anticipatory activation of the rolling or coasting function in particularly suitable situations or anticipatory deactivation that sufficiently considers the respective topographical conditions. In addition, the combination of rolling or coasting operation with Tempomat and Bremsomat systems, which are increasingly found in modern vehicles, is not provided.

A method is known from DE 10 2007 001 936 A1 to control a shifting clutch of an automatic transmission of a motor vehicle in which hill detection and neutral idle controls are continuously evaluated and checked. The method is executed in order to save fuel in a neutral transmission position during idling states of the internal combustion engine, while stopping at a signal, or in stop-and-go operation. In addition, the vehicle is prevented from rolling backward on an incline when there is not enough brake pressure to hold the vehicle when the transmission shifts into neutral.

Certain initial conditions have to be satisfied in such a neutral idle control system, that is, situation-controlled neutral shifting, which includes the evaluation of a hill detection flag and a hill counter. A hill detection flag can be set when there is a corresponding evaluation using hill detection, or a hill counter can be incremented. This is the case when the transmission is in a forward gear, the rotational speed of the transmission output shaft is greater than a specified output shaft rotational speed limit, a throttle position of the internal combustion engine is less than a specified throttle position limit, a brake status indicates that the vehicle brake is actuated, and the transmission temperature is within a permissible range.

Rollback-free neutral idle shifting is possible when the current counter reading is less than a specified counter limit, or when the brake pressure is greater than a precalculated brake pressure limit when the counter reading is above this counter limit, or if the brake pressure is not available and the counter reading is greater than the counter limit when a hill detection flag is set.

The known method uses continuously detected transmission, engine and brake data from the vehicle that, after being evaluated by a counter, supply reliable signals for usefully shifting the vehicle into neutral. However, it is somewhat limited to an immobile or nearly immobile vehicle and hence cannot be easily transferred in driving mode to so-called rolling or coasting on flat areas or a downhill gradient. In particular, suitable or unsuitable rolling situations on downhill grades or tapering downhill grades hence tend not to be identified, and neutral shifting is not triggered or is prevented in these situations.

DE 10 2004 017 115 A1 makes known a method for the automatic driving speed control or driving speed and separation distance control for a vehicle comprising an automatic or automated transmission, in which the driving speed can vary within the range of preselected target speeds. In that particular case, an acceleration phase is followed by a roll-out phase in which the flow of power in the drive train can be interrupted to save fuel. Topographical data, data from a monitoring device pertaining to the immediate vehicle surroundings, and/or certain vehicle parameters can be taken into account via a navigation device in the sequence of acceleration and roll-out phases. The acceleration phases can be supported by an electric motor which is present in addition to an internal combustion engine.

The known method uses a coasting or rolling mode to control speed in acceleration and roll-out phases that alternate within a Tempomat or Bremsomat system. This is also not easily applicable to downhill travel with a subsequent transition to a flat area.

WO 2003/037672 A1 makes known a multi-speed transmission, in particular for heavy commercial vehicles, which is shifted into neutral, i.e. into a rolling mode, when a low-consumption driving state is detected. A low-consumption driving state is detected and the neutral position is attained via shifting when a target speed is specified and the driving speed would decrease without the rolling mode. This is assumed, in particular, when neither the gas pedal nor the brake pedal is pressed and equivalent variables do not change. A supplemental brake system, which can be requested in rolling mode, is provided for safety reasons. The gear that is currently engaged is also taken into consideration.

The disadvantage thereof is that an anticipatory evaluation of the rolling mode is not provided, and therefore unfavorable neutral shiftings can be triggered. In particular, the topographical driving situation is not taken into sufficient consideration.

In addition, a method is known from WO 2009/037167 A1 for controlling an automated or automatic multi-step transmission of a motor vehicle, such as a heavy commercial vehicle, in which a higher gear is shifted into before the downhill gradient taper or before starting traction mode, that is, a thrust upshift is executed, to reduce fuel consumption while driving down a gradient and then transitioning into a gradient taper instead of only upshifting after leveling out or transitioning from thrust mode to traction mode as usual.

The current downhill roadway gradient is determined in a specified interval, and a function is activated when driving downhill to identify the downhill gradient taper to automatically upshift as early as possible. The rotational speed of the drive motor and possibly of an active constant braking device is thereby reduced which could cause the motor vehicle to accelerate due to the lower engine drag torque and possibly lower retarder braking torque, thereby causing the traction mode to start comparatively later. The higher gear is selected so that the motor vehicle only accelerates slightly, and the driver can control the situation safely at all times.

The downhill gradient taper is identified when the downhill gradient, just traveled, decreases steadily over a specific number of intervals and falls below a threshold. In addition, various criteria can be provided such as the actuation of the service brake, excessive vehicle acceleration, an excessively steep downhill gradient, a particularly heavy load, the operation of an auxiliary brake at its load limit, exceeding a target speed or falling below a safe separation distance regulated by an active Tempomat or Bremsomat that, for reasons of safety, lead to the blocking of thrust upshifting.

Such driving with flywheel momentum with thrust upshifting is characterized by reduced fuel consumption in commercial vehicles, especially on long stretches with a corresponding topography. However, the efficiency of a rolling or coasting function tends not to be realized in the known method.

SUMMARY OF THE INVENTION

Against this background, the object of the invention is to present a method for controlling a rolling or coasting function of a vehicle having an automatic or automated transmission and a speed control device, or a Tempomat/Bremsomat system, by means of which the rolling or coasting function can be effectively and reliably used during particularly suitable driving situations taking into account the influence of the Tempomat or Bremsomat system.

The invention is based on the knowledge that the transmission can be shifted to neutral when driving in a vehicle having a rolling or coasting function and driving speed control device, or Tempomat or Bremsomat system, when transitioning from a downhill gradient section to a flat area once this is reconcilable with the active Tempomat or Bremsomat system, so that the vehicle rolls in the flat area as far as possible to save fuel without being driven before the Tempomat requests engine torque to maintain a set Tempomat speed.

The invention is accordingly based on a method for controlling a rolling or coasting function of a vehicle, such as a commercial vehicle, with a drive train having a drive motor, an automatic or automated transmission that is controllable by means of transmission controls, with controllable shifting means for interrupting the flow of power in the drive train, with a brake device, preferably an auxiliary braking system, and with a driving speed control device, wherein the current roadway incline, vehicle speed and vehicle acceleration are determined, and the vehicle speed is regulated by means of the driving speed control device, wherein the braking device is controlled to actuate it when driving on a downhill gradient section.

To achieve the proposed object, the invention provides checking a rolling or coasting condition for a downhill gradient taper when driving on the downhill gradient section and, when the rolling or coasting condition is satisfied, the transmission controls interrupt the flow of power in the drive train before entering a flat area, and/or before an engine torque request from the driving speed control device.

A rolling function or rolling mode is understood to mean driving a vehicle with the drive train disengaged, i.e. non-driven forward driving or driving via flywheel momentum, with the drive motor running. A coasting function or coasting mode is understood to mean driving a vehicle with the drive train disengaged and the drive engine shut off.

A drive speed control device is understood to be a vehicle system having both a drive speed control device (Tempomat) and a brake control device (Bremsomat) for intervening in driving or braking. In this context, such a system is accordingly also called a Tempomat/Bremsomat system. The system can also have a separation distance control device.

Corresponding to the usual conventions regarding signs, downhill gradients are considered negative slopes, decelerations are considered negative acceleration, and the force resulting driving downhill is considered negative resistance.

The method according to the invention advantageously achieves the reliable recognition of a downhill gradient taper as a particularly suitable roadway topography for so-called rolling or coasting the vehicle, and the rolling or coasting function is then immediately activated to achieve a high savings effect. Likewise, a downhill gradient taper that is a rather unsuitable for rolling or coasting mode is recognized to prevent unnecessary shifting into neutral or unnecessary interruption of the flow of power in the drive train. Consequently, the efficiency of driving operation, for example in commercial vehicles, is improved by effectively using the rolling or coasting function.

Since the Tempomat/Bremsomat function executes interventions in the powertrain which affect speed and/or safety, and since the rolling or coasting function enables neutral shifting which affects consumption, it has proven advantageous to coordinate as needed both functions, if available, to achieve effective and comfortable driving. Their independent functions are not thereby abandoned since the Tempomat/Bremsomat is only activated in response to a driver's wish and/or under certain conditions, whereas fuel saving neutral shifting tends to be automatically activatable and deactivatable depending on the situation.

If a Tempomat/Bremsomat system is available and active, the coordination of the Tempomat/Bremsomat functions and the rolling or coasting function can be advantageously controlled by existing, correspondingly adapted transmission controls. The rolling or coasting situations can be controlled by means of a transmission control unit that detects relevant signals and evaluates data, and subsequently issues, identifies and controls commands to initiate, execute, or block the rolling or coasting function. In vehicles having Tempomat or Bremsomat devices, the software in the controllers for these systems does not have to be changed, which has an economical effect.

The rolling or coasting function can be activated when the current roadway incline allows driveless forward travel, or driving with flywheel momentum. In a situation applicable to the method according to the invention, the vehicle is accordingly first in a downhill gradient section in thrust mode while the driving speed control device is active, and an available auxiliary brake system is active as needed to prevent the vehicle from exceeding a set Bremsomat speed. In a subsequent transition to a flat area, a tapering downhill gradient situation is evaluated.

The rolling or coasting condition can be identified as satisfied by the transmission control unit when the evaluation first shows that the auxiliary brake system or brake device has been deactivated. When the auxiliary brake is active, shifting to neutral would obviously be counterproductive since it would counteract the desired braking.

Secondly, a set difference between a Bremsomat speed and a Tempomat should be greater than a threshold. The current vehicle speed should then be close to the set Bremsomat speed, but higher than a threshold of the set Tempomat speed. It can be determined therefrom whether a significant rolling phase is possible, or if the driving speed control device would quickly end or suppress it.

It is then determined whether a deceleration of driving (negative acceleration) exists by evaluating the currently requested vehicle acceleration (without active brake actuation) in comparison to the value zero, or a threshold close to zero. The fact that this driving deceleration is actually leading to a tapering downhill gradient, that is, a topographical transition from a downhill gradient (negative slope) to a flat area (no slope) is indicated by the fact that the current roadway incline lies above a threshold, that is, it is still on the downhill gradient section, and the time derivative of the roadway incline is greater than zero or lies above a threshold close to zero, that is, the roadway incline is gradually changing toward the flat area.

The required roadway incline can be measured by available sensors and/or calculated by an algorithm. Since the incline signals determined while driving can undergo strong fluctuations, suitable signal averaging or filtering is also recommendable to improve the incline data.

When the rolling or coasting condition is recognized as being satisfied, the flow of power in the drive train is interrupted as soon as possible, advantageously while in thrust mode, and possibly close to the time of deactivating the auxiliary brake system or brake device if it was previously active. No potential vehicle momentum is lost, thus enabling the vehicle to continue advancing as long or far as possible without being driven. The Tempomat/Bremsomat system which remains active ensures that the vehicle moves within a safe and comfortable speed corridor.

The flow of power is preferably interrupted by shifting the transmission to neutral, i.e., by disengaging a currently engaged gear. Accordingly, the flow of power can be interrupted without disengaging a clutch device arranged between the drive motor and transmission. Is it is necessary to overcome the tension in the drivetrain arising in thrust mode from the braking effect of the engine, especially the friction torque in the shift dog of a dog-shifted transmission.

To disengage a currently shifted gear, provision can accordingly be made so that, first one or more valves arranged in a pressure circuit that can apply adjusting pressure to at least one actuator of the shifting elements or shifting dogs of the gear, can be actuated to disengage the manual or dog-type transmission.

If the force of the actuator is insufficient to overcome the friction in the shifting elements, especially the shift dogs, arising from the transmitted thrust torque, provision can additionally be made to temporarily increase the amount of fuel injected in the drive motor, which is designed as an internal combustion engine, by means of an engine intervention to reduce the thrust-related transmission force of the shifting element of the gear.

When the amount of injected fuel is increased, torque loss is advantageously taken into account so that the amount of injected fuel or the torque thereby generated in the internal combustion engine, causes the amount of torque transmitted in the transmission to approach zero, thus allowing the gear to be disengaged at least approximately load free. Finally, provision can be made for the flow of power to be interrupted by disengaging the startup or lock-up clutch, depending on the transmission design.

BRIEF DESCRIPTION OF THE DRAWING

A drawing of an exemplary embodiment accompanies the description to illustrate the invention. The sole FIGURE therein portrays a schematic representation of the mode of operation according to the invention of a rolling or coasting function in a commercial vehicle.

DETAILED DESCRIPTION OF THE PREFERRED EMBODIMENTS

The commercial vehicle has an internal combustion engine and an automated single- or multi-group transmission with dog-shifted gears and transmission controls. Furthermore, the drive train has an auxiliary brake system designed e.g. as a hydrodynamic or electrodynamic retarder, and a Tempomat/Bremsomat system as a drive speed control device. Vehicles with such drive trains are known per se; consequently, the following description is restricted to a method according to the invention for controlling the rolling or coasting function of such a vehicle.

The method according to the invention basically involves interrupting the flow of power in the drive train in thrust mode instigated by transmission controls as soon as possible after a retarder shuts off and before entering a flat area at a different time from the Tempomat's request for engine torque when driving on a downhill gradient section while the rolling or coasting condition is satisfied, taking into account the functions and mode of an active Tempomat/Bremsomat system.

Consequently, the commercial vehicle 1 according to the single FIGURE in the drawing is first on a downhill gradient section 2 with a relatively large negative slope $\alpha\_Fb$ in a thrust mode in which the drive train is engaged. Shifting to neutral is not recommendable in this case since the braking effect of the engine is required to limit or maintain the vehicle speed $v\_F$, and the internal combustion engine does not consume any fuel due to the overrun fuel cutoff.

The vehicle 1 accelerates, and the vehicle speed $v\_F$ approaches a Bremsomat speed $v\_B$ set beforehand by the driver. Upon reaching the Bremsomat speed $v\_B=v\_F$, a speed regulator activates the auxiliary brake to keep the vehicle 1 at a constant speed $v\_F=$constant. Then at time $t\_1$, the vehicle 1 reaches a downhill gradient taper 3, that gradually transitions into a flat area 4, upon which the auxiliary brake is shut off at time $t\_1$ by the Bremsomat.

The rolling or coasting condition is checked by the transmission controls. A status query determines whether the Tempomat and Bremsomat are active and the auxiliary brake system is no longer activated. The current vehicle acceleration $a\_F$ is queried and evaluated.

If the vehicle acceleration $a\_F$ is negative with reference to a threshold such as $a\_F\_lim=0$ m/s$^2$ due to increased driving resistance $F\_W$, it is recognized that deceleration, i.e., the initial tapering of the downhill gradient 3 in trust mode exists without the active effect of braking. The driving resistance $F\_W$ results from the air resistance, rolling resistance, negative slope resistance (downhill gradient resistance) and negative acceleration resistance (deceleration resistance).

It is also determined whether the current roadway incline $\alpha\_Fb$ recalculated as the grade from the incline angle lies above a threshold, and whether the time derivative $\alpha'\_Fb$ lies above another threshold, in particular whether $\alpha'\_Fb>0\%$/sec applies. This allows the conclusion that the road topography is changing from a negative slope (that is, a downhill gradient) into a flat roadway topography.

It is also determined whether a difference $\Delta v\_B\_T$ between the previously set Bremsomat speed $v\_B$ and the previously set Tempomat speed $v\_T$ is greater than a predetermined threshold, and whether the related current vehicle speed $v\_F$ is close to the Bremsomat speed $v\_B$ and further from the Tempomat speed $v\_T$ than another specified threshold. From this, it can be determined whether shifting into neutral in the current driving situation would be effectively beneficial.

If the current vehicle speed $v\_F$ is only slightly above the Tempomat speed $v\_T$, the vehicle 1 could scarcely decrease speed in a rolling phase a since a Tempomat controller would quickly request engine torque $M\_M$ to maintain the Tempomat speed $v\_T$ after which the drive train would be engaged to transmit drive torque to the driven wheels.

Accordingly, activation of the rolling or coasting function by the transmission control unit would only be considered recommendable when, on the one hand, a downhill gradient taper 3 is identified that gradually transitions into a flat area 4 and, on the other hand, a sufficiently long rolling phase is possible in which the active Tempomat-/Bremsomat system does not intervene in the powertrain.

If this is the case, the transmission shifts to neutral as the control valves for actuating actuators are activated to disengage the current gear. If the resulting force of the actuators or actuating cylinders is sufficient to overcome a coefficient of friction in the shift dogs of the gear from the transmitted thrust torque of the vehicle still in thrust mode, the gear is disengaged.

If this is not the case, the amount of injected fuel for the internal combustion engine is gradually increased by an engine intervention to reduce the thrust torque and hence the coefficient of friction in the shift dogs. The amount injected is increased at most up to a value at which the loss torque transmitted by the engine control unit is reached. When this value is reached, the load transmitted by the transmission disappears. The gear can then generally be easily disengaged since the friction in the shift dogs is gone. If this is still impossible, a startup clutch or lock-up clutch in the drivetrain, that reliably disconnects the internal combustion engine from the drive train, can be disengaged.

The result of a useful shift to neutral is identifiable in the sole FIGURE in three time graphs stacked on each other for comparison. The top speed graph shows the speed corridor $\Delta v\_B\_T$ between the previously set Bremsomat speed $v\_B$ and Tempomat speed $v\_T$. Within this corridor $\Delta v\_B\_T$, a first speed curve $v\_F\_A$ runs with an engaged drive train, and a second speed curve $v\_F\_N$ runs with the transmission shifted to neutral, i.e., with a disengaged drive train.

At time $t\_1$ in which the auxiliary brake system is deactivated, the two speed curves $v\_F\_A$ and $v\_F\_N$ start to drop in comparison to the vehicle speed $v\_F$ previously limited to the Bremsomat speed $v\_B$. Deceleration currently starts as the downhill gradient decreases. When the transmission is shifted to neutral, the vehicle speed curve $v\_F\_N$ falls much more slowly, however, i.e., until the Tempomat speed $v\_T$ is reached, the vehicle 1 rolls longer and further without being driven than it would travel with an engaged gear in speed curve $v\_F\_A$.

The middle braking torque graph illustrates the activation of the auxiliary brake system by the Bremsomat. This yields a braking torque curve $M\_B\_D$ of the auxiliary brake system. At time $t\_1$, the auxiliary brake system is no longer activated. Before then, the auxiliary brakes are turned on to keep the vehicle speed $v\_F$ constant at the Bremsomat speed $v\_B$. Then the braking torque $M\_B$ decreases to the value zero.

The bottom engine torque graph illustrates the request for engine torque $M\_M$ by the Tempomat. It shows a first torque request curve $M\_M\_A$ without shifting to neutral, and a second torque request curve $M\_M\_N$ with shifting to neutral. The two curves $M\_M\_A$ and $M\_M\_N$ obviously correspond to the related speed curves $v\_F\_A$ and $v\_F\_N$. Accordingly, when shifting to neutral at the transition between the downward gradient 2 and flat area 4, engine torque $M\_M$ is requested much later before the speed falls below the Tempomat speed $v\_T$ than when the drivetrain remains engaged since the vehicle 1 continues to roll on the flat area 4 or even until the next initial rise. Significant fuel savings in this driving situation are accordingly achieved with the rolling or coasting function.

LIST OF REFERENCE CHARACTERS

1 Commercial vehicle
2 Downhill grade
3 Gradient taper

4 Flat area
a_F Vehicle acceleration
a_F_lim Vehicle acceleration threshold
α_Fb Roadway incline
α'_Fb Time derivative of the roadway incline
F_W Driving resistance
M_B Braking torque
M_B_D Continuous braking torque curve
M_M Engine torque
M_M_A Engine torque request curve with drive power connection
M_M_N Engine torque request curve with shifting to neutral
t Time
t_1 Point in time
v Speed
v_B Bremsomat speed
v_F Vehicle speed
v_F_A Vehicle speed curve with drive connection
v_F_N Vehicle speed curve with shift into neutral
v_T Tempomat speed
Δv_B_T Difference in speed

The invention claimed is:

1. A method of controlling either a rolling or a coasting function of a vehicle for a drive train comprising a drive motor, either an automatic or an automated transmission, that is controllable by transmission controls with controllable shifting for interrupting a flow of power in the drive train, a brake device, a drive speed control device, a current roadway incline (α_Fb), vehicle speed (v_F) and vehicle acceleration (a_F) are determined, and the vehicle speed (v_F) being regulated by the drive speed control device, and the brake device being controllable for actuation when driving on a downhill gradient section (2), the method comprising the steps of:
   checking either rolling or a coasting condition for a downhill gradient taper (3) when driving on the downhill gradient section (2),
   interrupting the flow of power in the drive train, with the transmission controls, before entering a flat area (4) at least one of when the rolling or the coasting condition is satisfied and before an engine torque is requested from the driving speed control device; and
   considering either the rolling or the coasting condition satisfied when the driving speed control device is active and at least one of:
   a) the braking device is deactivated,
   b) a set difference (Δv_B_T), between a upper seed regulated by a Bremsomat (v_B) and a lower speed regulated by a Tempomat (v_T) is greater than a threshold,
   c) the current vehicle speed (v_F) is close to a set Bremsomat speed (v_B) and is higher than a threshold of a set Tempomat speed (v_T),
   d) the current vehicle acceleration (a_F), is identified as being either a deceleration toward zero, or a threshold close to zero (a_F_lim),
   e) the current roadway incline (α_Fb) lies above a threshold and
   f) a time derivative (α'_Fb) of the roadway incline (α_Fb) is either above zero or above a threshold close to zero.

2. The method according to claim 1, further comprising the step of interrupting the flow of power in a thrust mode.

3. The method according to claim 1, further comprising the step of interrupting the flow of power when the transmission shifts to neutral.

4. The method according to claim 1, further comprising the step of interrupting the flow of power by a transmission shifted with shift dogs.

5. The method according to claim 1, further comprising the step of actuating at least one valve, arranged in a pressure circuit that applies an adjusting pressure to at least one actuator of a shifting element of a gear, to disengage the shifting element of a currently shifted gear.

6. The method according to claim 1, further comprising the step of temporarily increasing an amount of fuel injected in the drive motor, by an engine intervention, to reduce thrust-related transmission force of the shifting element of the gear to disengage a currently shifted gear.

7. The method according to claim 6, further comprising the step of taking into account torque loss, when increasing the amount of fuel injected, so that the amount of fuel injected corresponds to torque transmitted in the transmission approaching zero.

8. The method according to claim 1, further comprising the step of interrupting the flow of power by disengaging a clutch device, arranged between the drive motor and the transmission, by which the drive motor is disconnected from the drive train.

9. A method of controlling either a rolling or a coasting function of a vehicle for a drive train comprising a drive motor, either an automatic or an automated transmission, that is controllable by transmission controls with controllable shifting for interrupting a flow of power in the drive train, a brake device, a drive speed control device, a current roadway incline(α_Fb), vehicle speed (v_F) and vehicle acceleration (a_F) are determined, and the vehicle speed (v_F) being regulated by the speed control device, and the brake device being controllable for actuation when driving on a downhill gradient section (2), the method comprising the steps of:
   checking either rolling or a coasting condition for a downhill gradient taper (3) when driving on the downhill gradient section (2);
   interrupting the flow of power in the drive train, with the transmission controls, before entering a flat area (4) at least one of when the rolling or the coasting condition is satisfied and before an engine torque is requested from the driving speed control device; and
   interrupting the flow of power close to the deactivation of the braking device once either the rolling or the coasting condition is fulfilled.

10. A method of controlling either a rolling or a coasting function of a commercial vehicle (1) having a drive train comprising a drive motor, either an automatic or an automated transmission, which is controllable by transmission controls with controllable shifting devices for interrupting a flow of power in the drive train, an auxiliary braking system, and a drive speed control device, the method comprising the steps of:
   determining current roadway incline (α_Fb), a vehicle speed (v_F) and a vehicle acceleration (a_F);
   regulating the vehicle speed (v_F) with the drive speed control device;
   controlling the auxiliary braking system to actuate the auxiliary braking system when driving on a downhill gradient section (2);
   checking either a rolling or a coasting condition for a downhill gradient taper (3) when driving on the downhill gradient section (2);
   interrupting the flow of power in the drive train, via the transmission controls, when either the rolling or the coasting function is satisfied and before at least one of entering a flat area (4) and receiving an engine torque request from the driving speed control device; and considering either the rolling or the coasting condition satisfied when the driving speed control device is active and at least one of:
a) the braking device is deactivated,
b) a set difference (Δv_B_T), between a upper speed regulated by a Bremsomat (v_B) and a lower speed regulated by a Tempomat (v_T), is greater than a threshhold,
c) the current vehicle speed (v_F) is close to a set Bremsomat speed (v_B) and is higher than a threshold of a set Tempomat speed (v_T),
d) the current vehicle acceleration (a_F), is identified as being either a deceleration toward zero, or a threshold close to zero (a_F_lim),
e) the current roadway incline ($\alpha$_Fb) lies above a threshold, and
f) a time derivative ($\alpha'$_Fb) of the roadway incline ($\alpha'$_Fb) is either above zero or above a threshold close to zero.

11. The method according to claim 10, further comprising the step of considering either the rolling or the coasting condition satisfied when the driving speed control device is active and each of the following occurs:
a) the braking device is deactivated,
b) the set difference (Δv_B_T), between the upper speed regulated by a Bremsomat (v_B) and the lower speed regulated by the Tempomat (v_T), is greater than the threshold,
c) the current vehicle speed (v_F) is close to the set Bremsomat speed (v_B) and is higher than the threshold of the set Tempomat speed (v_T),
d) the current vehicle acceleration (a_F), is identified as being either the deceleration toward zero, or the threshold close to zero (a_F_lim),
e) the current roadway incline ($\alpha$_Fb) lies above the threshold, and
f) the time derivative ($\alpha'$_Fb) of the roadway incline ($\alpha$_Fb) is either above zero or above the threshold close to zero.

12. The method according to claim 10, further comprising the step of temporarily increasing an amount of fuel injected in the drive motor, by an engine intervention, to reduce thrust-related transmission force of the shifting element of the gear to disengage a currently shifted gear.

13. The method according to claim 12, further comprising the step of taking into account torque loss, when increasing the amount of fuel injected, so that the amount of fuel injected corresponds to torque transmitted in the transmission approaching zero.

* * * * *